(No Model.) 3 Sheets—Sheet 1.

G. A. ENSIGN.
PLANING MACHINE.

No. 567,085. Patented Sept. 1, 1896.

Witnesses
G. F. Downing
S. G. Nottingham

Inventor
G. A. Ensign
By M. D. Leggett & Co.
Attorneys (No Model.) 3 Sheets—Sheet 2.
G. A. ENSIGN.
PLANING MACHINE.
No. 567,085. Patented Sept. 1, 1896.
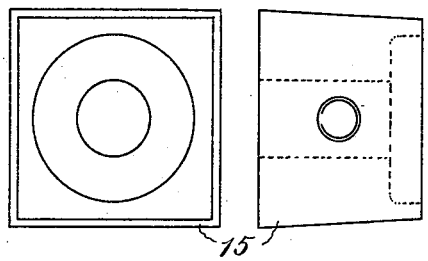
Fig. 5.
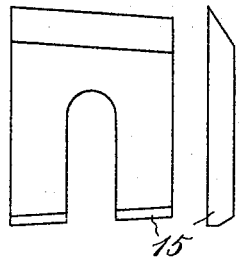
Fig. 6.
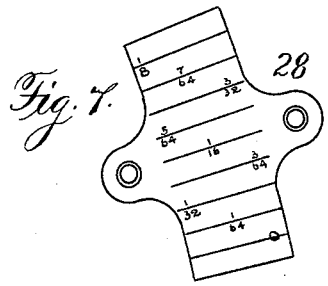
Fig. 7.
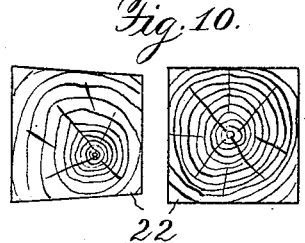
Fig. 10.
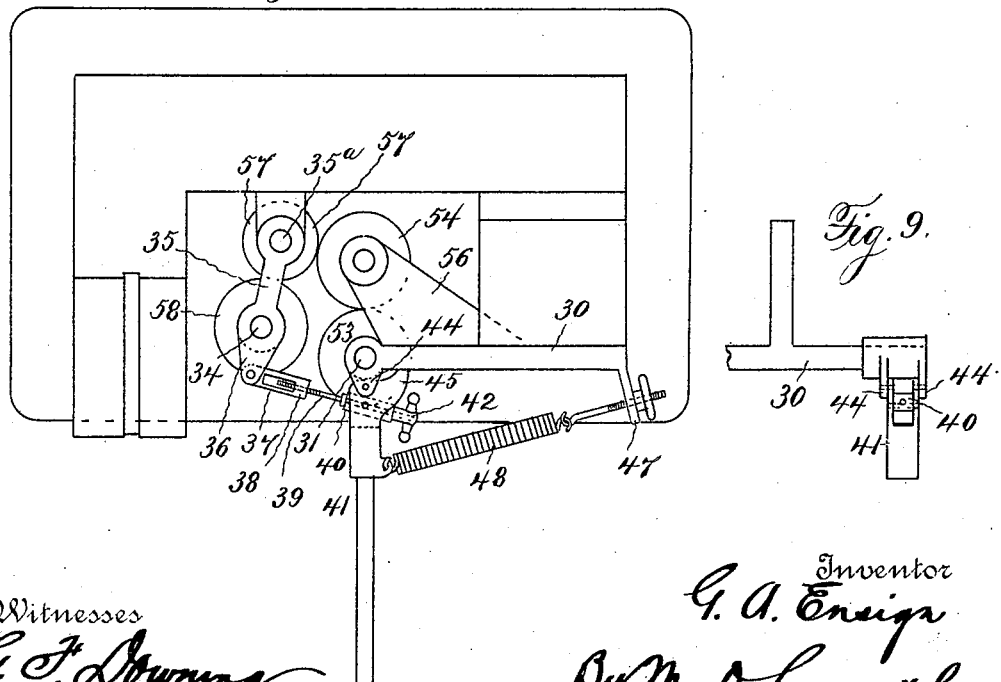
Fig. 8.
Fig. 9.
Witnesses
G. F. Downing
S. G. Nottingham
Inventor
G. A. Ensign
By M. D. Leggett & Co
Attorneys (No Model.) 3 Sheets—Sheet 3.

G. A. ENSIGN.
PLANING MACHINE.

No. 567,085. Patented Sept. 1, 1896.

Witnesses
G. F. Downing
S. W. Foster

Inventor
George A. Ensign
By H. A. Seymour
Attorney

UNITED STATES PATENT OFFICE.

GEORGE A. ENSIGN, OF DEFIANCE, OHIO, ASSIGNOR TO THE DEFIANCE MACHINE WORKS, OF SAME PLACE.

PLANING-MACHINE.

SPECIFICATION forming part of Letters Patent No. 567,085, dated September 1, 1896.

Application filed September 16, 1895. Serial No. 562,667. (No model.)

*To all whom it may concern:*

Be it known that I, GEORGE A. ENSIGN, of Defiance, in the county of Defiance and State of Ohio, have invented certain new and useful Improvements in Planing-Machines; and I do hereby declare the following to be a full, clear, and exact description of the invention, such as will enable others skilled in the art to which it appertains to make and use the same.

My invention relates to an improvement in planing-machines, and more particularly to such as are employed for planing the fellies of wheels, the object of the invention being to produce a machine for the purpose stated which shall be comparatively cheap in construction and one which can be easily and quickly adjusted to operate on fellies of different sizes and to cut beveled faces of any desired degree of bevel on said fellies.

A further object is to provide a planing-machine with feeding devices which can be readily adjusted, and to provide said feeding-rollers with an adjustable tension device.

With these objects in view the invention consists in certain novel features of construction and combinations and arrangements of parts, as hereinafter set forth, and pointed out in the claims.

Figure 1:
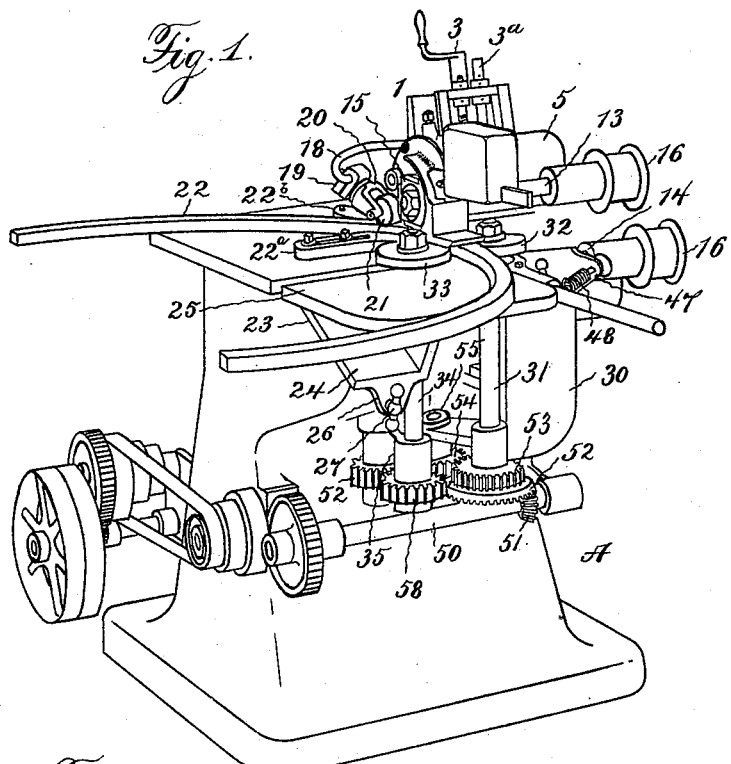
Figure 2:
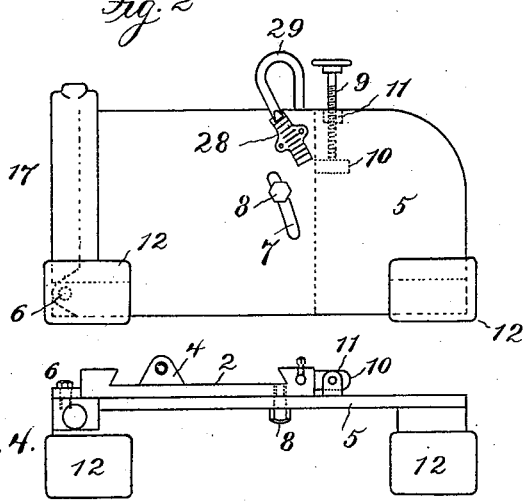
Figure 3:
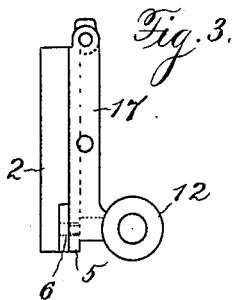
Figure 4:
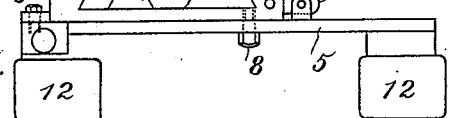
Figures 11, 12, 13:
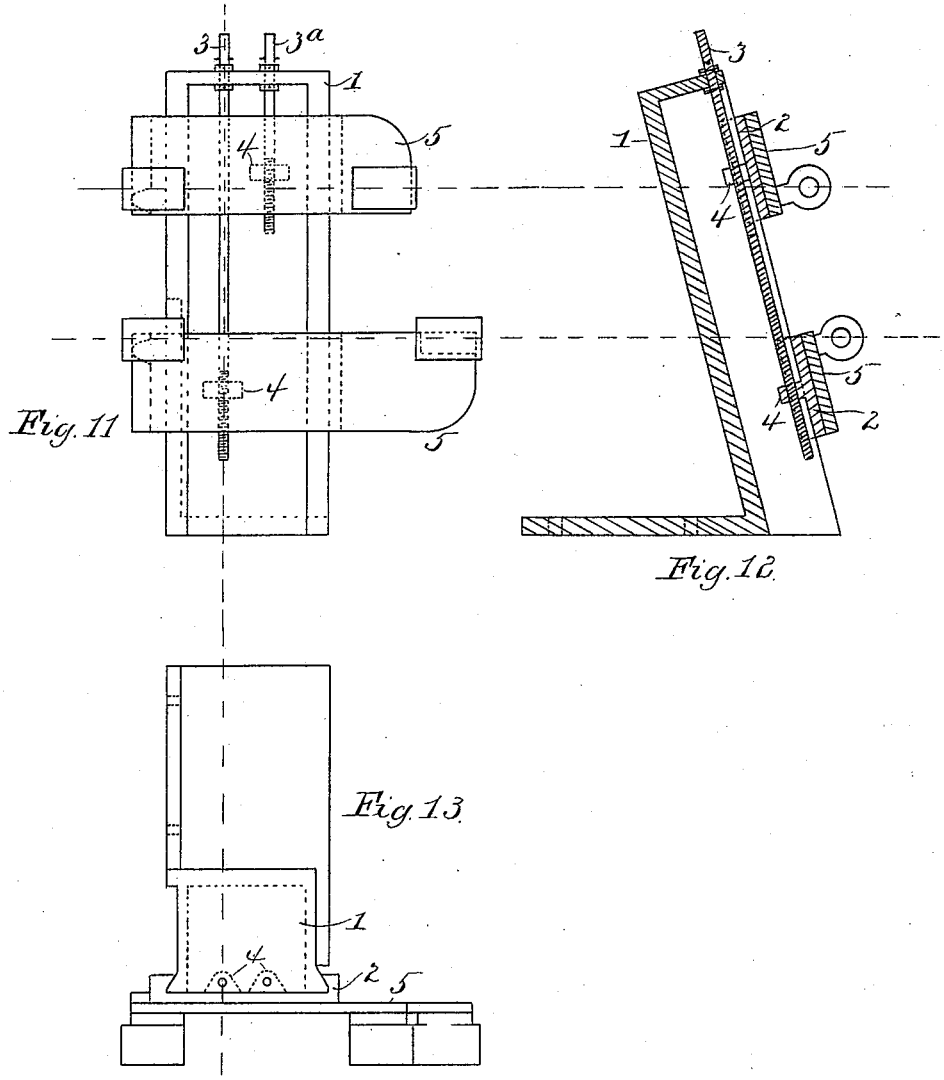

In the accompanying drawings, Figure 1 is a perspective view of a planing-machine embodying my improvements, and Figs. 2, 3, 4, 5, 6, 7, 8, 9, and 10 are detail views. Fig. 11 is a detached view showing knee 1, saddles 2 2, and the means for adjusting the same. Fig. 12 is a vertical sectional view of the same, and Fig. 13 is a plan view.

A represents a framework having a stationary or fixed table $a$ thereon and also having a knee 1. To each knee 1 vertically-movable saddles 2 2 are attached and adapted to be adjusted by means of screws 3 $3^a$, respectively, said screws passing through lugs 4, made on the respective saddles. To each saddle a bed-plate 5 is pivotally connected, as at 6, and provided with an elongated slot 7, through which a screw 8 passes, said screw being tapped into the saddle and adapted to retain the bed-plate at the adjustment to which it is set. In order to provide ready means for adjusting the bed-plates, screws 9 will be employed. Each screw 9 passes through a lug 10 on the saddle and a lug 11 on the bed-plate, and the purpose of this adjustment will presently be made apparent. Each bed-plate is made with perforated bosses 12, which serve as bearings for the cutter shafts or spindles 13 14, each spindle carrying cutters 15, Figs. 5 and 6, adapted to operate on the respective faces of the felly. Each shaft or spindle 13 14 is provided with a suitable pulley 16, whereby power can be transmitted to them.

The upper bed-plate is made with a lug or boss 17, having a socket for the reception of the bent arm 18, the free end of which is provided with a head 19, to which the bracket or yoke 20 of a presser-roller 21 is secured, the latter being adapted to press upon the felly 22, disposed on the table of the machine and guided by means of adjustable guides $22^a$ $22^b$. The frame of the machine is made with an inclined face 23, which serves as a guideway for the beveled bracket 24 of a movable table 25, and said bracket is provided with a depending lug 26, through which an adjusting-screw 27 passes, the latter being made to enter a socket in the frame. By means of the screw 27 the movable table can be adjusted for varying the amount of stock to be removed by the lower cutter.

From the construction and arrangement of parts above described it will be seen that by turning the screws 3 $3^a$ the cutters can be readily adjusted for fellies of different thicknesses and that by operating the screws 9 the angle of the bed-plates, and consequently the angles of the cutters can be adjusted, to cut bevels of different degrees on the felly. It is a matter of some importance that these adjustments of the cutters to cause them to cut the desired bevel be very accurate, and I have provided means whereby their accuracy can be insured. These means comprise a graduated gage 28, secured to each bed-plate, and an indicator 29, secured to each saddle and adapted to register with the gage. The gage is so graduated that the adjustment of the bed-plates through the arc of a circle will bring the cutter-heads into such position as will plane a bevel of one sixty-fourth of an inch on a felly one inch wide for each space of the graduated gage. Thus it will be seen that the operator can accurately adjust the machine to cut a bevel on the felly of a certain predetermined degree.

The frame of the machine is provided with a bracket or casting 30, in one end of which the spindle 31 of one of the feed-rollers, 32, is mounted. The other feed-roller, 33, is carried by a vertical spindle 34, mounted in a swinging frame or gate 35, pivotally connected with the framework by a shaft 35$^a$.

It is a matter of importance in machines of this kind that means be provided for adjusting the feed-rollers for fellies of different thicknesses and that a proper adjustable tension device be also provided. For these purposes the devices now to be described will be employed. The swinging frame 35 is provided with lugs or ears 36, to which a yoke 37 is pivotally connected. The free end of the yoke 37 is made with a screw-threaded hole 38, through which a screw 39 passes, said screw (the plain portion thereof) also passing through a sleeve 40, pivotally connected to a lever 41, and said screw is provided at its free end with a handle 42, by means of which to operate it. The lever 41 is pivotally connected at one end to a lug or ear 44, projecting from the bracket 30, and is provided with a short arm 45, adapted to normally bear on said bracket at one side of said lug or ear.

The bracket 30 is provided at its opposite end with a lug 46, through which an adjusting-screw 47 passes, and to one end of said screw a spring 48 is attached, the other end of said spring being attached to the lever 41. From this construction and arrangement of parts it will be seen that the position of the two feed-rollers relatively to each other can be adjusted for fellies of different sizes by means of the screw 39 and that the tension of the movable feed-roller on the felly being operated upon can be readily adjusted by means of the adjusting-screw 47.

In practice the arm 45 of the lever 41 is held against the bracket 30 by the spring 48, and the feed-rollers will be so adjusted (by means of the screw 39) that they will be disposed one-eighth of an inch nearer together than the diameter of the felly to be operated upon. The feed-rollers can be separated by means of the lever 41 for the insertion of the felly, whereupon the lever will be released and the feed-rollers will bear against the felly with the proper pressure, the free end of the short arm 45 of said lever being then removed a short distance from the bracket 30.

Motion will be imparted to the main driving-shaft 50 by means of any suitable gearing. The said driving-shaft is provided with a bevel-pinion 51, which transmits motion to a bevel-gear 52 on the spindle 31. The bevel-gear 52 carries a gear-wheel 53, which meshes with and transmits motion to a gear 54 on a shaft 55, mounted in an arm 56, projecting from the bracket 30. The gear 54 transmits motion to a gear 57 on the shaft 35$^a$, and the latter transmits motion to a gear 58 on the spindle 34.

The machine will be provided with a chip-breaker 59 of any preferred form of construction, and the said chip-breaker is carried by the upper bed-plate.

My improvements are comparatively simple in construction, accurate in operation, can be easily and quickly adjusted, and will operate effectually in every respect in the performance of their functions.

Various slight changes might be made in the details of construction of my invention without departing from the spirit thereof or limiting its scope, and hence I do not wish to limit myself to the precise details of construction herein set forth; but, Having fully described my invention, what I claim as new, and desire to secure by Letters Patent, is—

1. In a planing-machine, the combination with a frame and cutting mechanism, of a shaft mounted in fixed bearings and carrying a feed-roller, a swinging frame or gate, a shaft mounted in said swinging frame or gate and carrying a feed-roller, a yoke pivoted to the free end of said frame or gate, a pivoted lever, and an adjusting-screw passing through said pivoted lever and connected therewith, said screw also entering said yoke, substantially as set forth.

2. In a planing-machine, the combination with a frame and cutting mechanism, of a shaft mounted in stationary bearings and carrying a feed-roller, a swinging frame or gate, a shaft mounted in said swinging frame or gate and carrying a feed-roller, a yoke pivotally connected to said frame or gate, a pivoted lever, a short arm on said lever adapted to engage the frame of the machine, a sleeve pivotally connected to said lever, a screw adapted to enter said yoke and pass through said sleeve, an adjusting-screw connected with the frame of the machine and a spring connected at one end to said adjusting-screw and attached at the other end to said pivoted lever, substantially as set forth.

3. In a planing-machine, the combination with a frame having a bracket, a shaft mounted in said bracket and carrying a feed-roller, a swinging frame or gate, a shaft mounted in said swinging frame or gate and carrying a feed-roller, a lever pivotally connected to said bracket and having a short arm to bear against the same, a yoke pivotally connected to the swinging frame or gate, a sleeve pivotally connected to the pivoted lever, a screw passing through said sleeve and entering a screw-threaded opening in said yoke, an adjusting-screw connected with said bracket and a spring connected at one end to said adjusting-screw and at the other end to said pivoted lever, substantially as set forth.

4. In a planing-machine, the combination with a frame and a bracket thereon, of a shaft mounted in said bracket and carrying a feed-roller, a swinging frame, a shaft pivotally connecting said swinging frame to the frame of the machine, a shaft mounted in said swinging frame and carrying a feed-roller, an arm on the bracket, a gear-wheel mounted at the end of said arm, a gear-wheel on the shaft which forms the hinge of the swinging frame and receiving motion from the first-mentioned gear-wheel, and gear-wheels on the feed-roller shafts meshing with the two first-mentioned gears respectively, and means for adjusting said swinging frame, substantially as set forth.

In testimony whereof I have signed this specification in the presence of two subscribing witnesses.

GEORGE A. ENSIGN.

Witnesses:
   GEO. W. DEATRICH,
   C. H. KETTENING.